United States Patent
Takahashi et al.

(10) Patent No.: US 11,824,241 B2
(45) Date of Patent: Nov. 21, 2023

(54) PROTON CONDUCTOR AND FUEL CELL

(71) Applicants: DENSO CORPORATION, Kariya (JP); Kyoto University, Kyoto (JP); KYUSHU UNIVERSITY, NATIONAL UNIVERSITY CORPORATION, Fukuoka (JP)

(72) Inventors: Kazuki Takahashi, Kariya (JP); Nobuyoshi Sakakibara, Kariya (JP); Kenichiro Kami, Kariya (JP); Satoshi Horike, Kyoto (JP); Tomofumi Tada, Fukuoka (JP)

(73) Assignees: DENSO CORPORATION, Kariya (JP); Kyoto University, Kyoto (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 0 days.

(21) Appl. No.: 17/539,281

(22) Filed: Dec. 1, 2021

(65) Prior Publication Data
US 2022/0181663 A1 Jun. 9, 2022

(30) Foreign Application Priority Data
Dec. 3, 2020 (JP) .................................. 2020-200953

(51) Int. Cl.
*H01M 8/1004* (2016.01)
*H01M 4/94* (2006.01)
*H01M 4/92* (2006.01)
*H01M 8/10* (2016.01)

(52) U.S. Cl.
CPC ......... *H01M 8/1004* (2013.01); *H01M 4/925* (2013.01); *H01M 4/94* (2013.01); *H01M 2008/1095* (2013.01)

(58) Field of Classification Search
CPC ...... H01M 8/1004; H01M 4/925; H01M 4/94; H01M 2008/1095; Y02E 60/50
See application file for complete search history.

(56) References Cited

U.S. PATENT DOCUMENTS

| | | | |
|---|---|---|---|
| 2006/0105226 A1 | 5/2006 | Kim et al. | |
| 2014/0017595 A1 | 1/2014 | Pillai et al. | |
| 2018/0183083 A1* | 6/2018 | Lee | H01M 4/9083 |
| 2020/0220192 A1* | 7/2020 | Takahashi | H01M 8/1016 |

OTHER PUBLICATIONS

Lee et. al., "Nonhumidified Intermediate Temperature Fuel Cells Using Protic Ionic Liquids", J. Am. Chem. Soc. 132 (28), 9764-9773 (Year: 2010).*
Lee et. al., "Nonhumidified Intermediate Temperature Fuel Cells Using Proticlonic Liquids" J. Am. Chem. Soc. 2010, 132 (28), 9764-9773.
Tomohiro Ogawa et al., "Coordination polymer glass from a protic ionic liquid: proton conductivity and mechanical properties as an electrolyte", The Royal Society of Chemistry 2020, P5175-5181, Apr. 2020.

* cited by examiner

*Primary Examiner* — Daniel S Gatewood
(74) *Attorney, Agent, or Firm* — POSZ LAW GROUP, PLC (57) ABSTRACT

A proton conductor is in contact with a catalyst containing platinum. The proton conductor includes a cationic organic molecule, a metal ion, and an oxoacid anion. A protic ionic liquid containing the cationic organic molecule and the oxoacid anion is coordinated to the metal ion to form a coordination polymer.

18 Claims, 8 Drawing Sheets

WORKING EXAMPLE

|  | DIFFUSION COEFFICIENT $[m^2/sec]$ |
|---|---|
| $^1H$(PEAK a) | 5.3 TO 5.5 × 10$^{-10}$ |
| $^1H$(PEAK b) | 5.2 TO 5.5 × 10$^{-10}$ |
| $^1H$(PEAK c) | 5.3 TO 5.4 × 10$^{-10}$ |
| $^1H$(PEAK d) | 6.1 TO 6.7 × 10$^{-10}$ |
| $^{19}F$ | 4.6 TO 4.8 × 10$^{-10}$ |
| PROTON TRANSPORT NUMBER | 0.64 |

FIG. 8

SECOND COMPARATIVE EXAMPLE

|  | DIFFUSION COEFFICIENT $[m^2/sec]$ |
|---|---|
| $^1H$(PEAK a) | 4.9 TO 5.1 × 10$^{-10}$ |
| $^1H$(PEAK b) | 4.7 TO 5.0 × 10$^{-10}$ |
| $^1H$(PEAK c) | 4.8 TO 5.0 × 10$^{-10}$ |
| $^1H$(PEAK d) | 4.8 TO 5.0 × 10$^{-10}$ |
| $^1H$(PEAK e) | 4.8 TO 4.9 × 10$^{-10}$ |
| $^{19}F$ | 3.9 TO 4.0 × 10$^{-10}$ |
| PROTON TRANSPORT NUMBER | 0.56 |

FIG. 9

PROTON CONDUCTOR AND FUEL CELL

CROSS REFERENCE TO RELATED APPLICATION

This application is based on Japanese Patent Application No. 2020-200953 filed on Dec. 3, 2020, the disclosure of which is incorporated herein by reference in its entirety.

TECHNICAL FIELD

The present disclosure relates to a proton conductor and a fuel cell.

BACKGROUND

At present, a medium temperature dry fuel cell that operates at 100° C. or more under a non-humidified condition is desired.

SUMMARY

A proton conductor in contact with a catalyst containing platinum includes a cationic organic molecule, a metal ion, and an oxoacid anion. The cationic organic molecule, the metal ion, and the oxoacid anion form a coordination polymer. A protic ionic liquid containing the cationic organic molecule and the oxoacid anion is coordinated to the metal ion to form the coordination polymer.

DESCRIPTION OF EMBODIMENTS

To begin with, examples of relevant techniques will be described.

At present, from the viewpoint of cost reduction and simplification of a solid polymer fuel cell system, a medium temperature dry fuel cell that operates at 100° C. or more under a non-humidified condition is desired. In order to operate the fuel cell under a non-humidified condition, a proton conductor plays an important role.

For example, a proton conductor is composed of phosphoric acid-doped polybenzimidazole. In the proton conductor containing phosphoric acid, the phosphoric acid covers platinum catalysts to form a reaction field.

On the other hand, phosphoric acid poisons the platinum catalysts, so that the catalytic activity decreases as using the proton conductor containing phosphoric acid. As a result, power generation performance deteriorates. Thus, a fuel cell formed with a protic ionic liquid is proposed.

However, the protic ionic liquid has a low proton transport number. Thus, when the protic ionic liquid is used as a proton conductor, the electromotive force of the fuel cell is lowered and thus the power generation performance is lowered.

In view of the above points, it is an objective of the present disclosure to provide a proton conductor that can suppress a decrease in power generation performance.

In order to achieve the above objective, a proton conductor in contact with a catalyst containing platinum includes a cationic organic molecule, a metal ion, and an oxoacid anion. The cationic organic molecule, the metal ion, and the oxoacid anion form a coordination polymer. A protic ionic liquid containing the cationic organic molecule and the oxoacid anion is coordinated to the metal ion to form the coordination polymer.

According to the proton conductor of the present disclosure, poisoning of platinum can be suppressed, and deterioration of power generation performance can be suppressed. Further, the proton conductor of the present disclosure has a higher proton transport number than a proton conductor composed of a protic ionic liquid, thereby suppressing deterioration of power generation performance.

Hereinafter, an embodiment of the present disclosure will be described with reference to the drawings.

Figure 1:
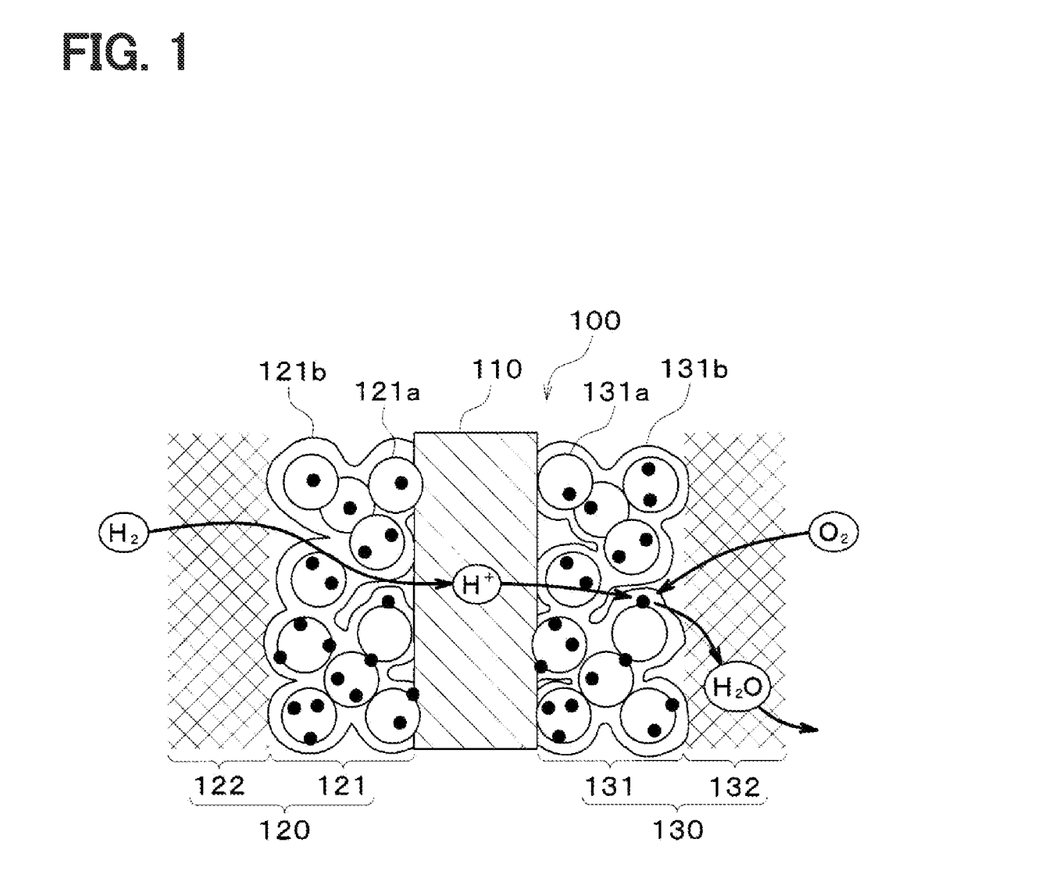
FIG. 1 is a diagram schematically illustrating a fuel cell according to an embodiment of the present disclosure.

As shown in FIG. 1, a fuel cell 100 includes a membrane electrode assembly (MEA). The MEA is composed of a pair of electrodes 120 and 130 and an electrolyte membrane 110 interposed between the pair of electrodes 120 and 130. The pair of electrodes 120 and 130 are an anode electrode 120 and a cathode electrode 130. The anode electrode 120 is also referred to as a hydrogen electrode and the cathode electrode 130 is also referred to as an air electrode. The cathode electrode 130 corresponds to a redox reaction electrode and the fuel cell 100 corresponds to a fuel cell.

The fuel cell 100 outputs electric energy through an electrochemical reaction between hydrogen and oxygen in air. The fuel cell 100 is provided as a basic unit. Multiple fuel cells 100 are stacked with each other and used as a stacked structure. Hydrogen is fuel gas and oxygen in the air is oxidant gas.

When the anode electrode 120 is supplied with hydrogen and the cathode electrode 130 is supplied with air, hydrogen and oxygen electrochemically react with each other to output electric energy as described below.

(Anode electrode) $H_2 \rightarrow 2H^+ + 2e^-$ (Cathode electrode) $2H^+ + \frac{1}{2}O_2 + 2e^- \rightarrow H_2O$ In this case, in the anode electrode 120, hydrogen is ionized into electron ($e^-$) and proton ($H^+$) through the catalytic reaction, and the proton ($H^+$) moves through the electrolyte membrane 110. On the other hand, in the cathode electrode 110, protons ($H^+$) migrating from the anode electrode 120, electrons flowing from the outside, and oxygen ($O_2$) in the air react with each other to generate water.

In the fuel cell 100 of the present embodiment, power is generated without humidifying the electrolyte membrane 110. That is, during operation of the fuel cell 100, dry air is supplied to the cathode electrode 130. Therefore, the fuel cell 100 can generate power at a temperature equal to or higher than 100° C.

The electrolyte membrane 110 is a proton conductor. The proton conductor forming the electrolyte membrane 110 includes a polymer as a binder and a proton carrier that is a proton conductive material. In this embodiment, polybenzimidazole is used as the polymer, phosphoric acid is used as the proton carrier, and phosphoric acid-doped polybenzimidazole is used as the electrolyte membrane 110.

The anode electrode 120 includes an anode catalyst layer 121 and an anode diffusion layer 122. The anode catalyst layer 121 is disposed in close contact with a surface of the electrolyte membrane 110 adjacent to the anode electrode 120. The anode diffusion layer 122 is disposed on an outer side of the anode catalyst layer 121 opposite to the electrolyte membrane 110. The cathode electrode 130 includes a cathode catalyst layer 131 and a cathode diffusion layer 132. The cathode catalyst layer 131 is disposed in close contact with a surface of the electrolyte membrane 110 adjacent to the cathode electrode 130. The cathode diffusion layer 132 is disposed on an outer side of the cathode catalyst layer 131 opposite to the electrolyte membrane 110. Each of the diffusion layers 122, 132 is made of a carbon cloth or the like.

The catalyst layers 121 and 131 include catalysts 121a and 131a and ionomers 121b and 131b coating the catalysts 121a and 131a. The catalysts 121a and 131a are catalyst-supported carbons supporting platinum catalysts that promote an electrochemical reaction. The platinum catalyst contains platinum. For example, the platinum catalyst may be platinum alone or a platinum-cobalt alloy including platinum and cobalt.

Each of the ionomers 121b and 131b includes a proton conductor and a polymer as a binder. The binder may be polytetrafluoroethylene (PTFE).

The proton conductor of the present embodiment is a protic structure in which a protic ionic liquid is coordinated to a metal. The protic ionic liquid is a liquid that can release protons. The proton conductor of the present embodiment is a coordination polymer (CP) having a continuous structure composed of ligands and metal ions, but may include a portion that is not a polymer.

The proton conductor of the present embodiment includes an anionic molecule and a cationic organic molecule. The anionic molecule has a negative charge and the cationic organic molecule has a positive charge. An attractive force acts between the anionic molecule and the cationic organic molecule, which have charges of opposite signs. That is, the anionic molecule and the cationic organic molecule form a single structure as a whole to balance the charges.

The anionic molecule is an anionic metal complex molecule. The anionic metal complex molecule includes a metal ion and a ligand that serves as a proton carrier. As the ligand, an oxoacid anion can be used.

The anionic metal complex molecule includes at least one chemical bond between the metal ion and the oxoacid anion. The oxoacid anion is a ligand having proton conductivity. It is required that at least one oxoacid anion is chemically bonded to the metal ion. It is preferable that multiple oxoacid anions be chemically bonded to the metal ion. A ligand other than the oxoacid anion such as a water molecule may also be bonded to the metal ion.

The chemical bond between the metal ion and the oxoacid anion can be exemplified by a coordination bond and a covalent bond, but is not limited to these. The anionic molecule is required to have the negative charge as a whole including the metal ion and the oxoacid anion. It is preferable that the anionic molecule have a charge of "−1".

As the metal ion of the anionic metal complex molecule, it is preferable to use a metal whose valence does not change, and it is more preferable to use a metal having no d electrons. As a metal for the metal ion of the anionic metal complex molecule, at least one metal selected from the group consisting of Al, Ga, Cs, Ba, K, Ca, Na, Mg, Zr, Ti, La, and Pr can be used. As the coordination number of the metal increases, the number of oxoacid anions chemically bonded to the metal ion increases, so that the proton conductivity can be improved.

The oxoacid anion in the anionic metal complex molecule may be any one having proton conductivity. As an oxoacid for the oxoacid anion of the anionic metal complex molecule, at least one of trifluoromethanesulfonic acid (TfOH), phosphoric acid, sulfuric acid, nitric acid and boric acid can be used.

As the cationic organic molecule, it is preferable to use an organic molecule having a charge of "+1". As the cationic organic molecule, at least one selected from the group consisting of ammonium cation, imidazolium cation, pyridinium cation, pyrrolidinium cation, and phosphonium cation can be used.

The bond between the anionic molecule and the cationic organic molecule is weaker than the chemical bond between the metal ion and the oxoacid anion. The structure including the anionic molecule and the cationic organic molecule forms a polymer.

In the structure of the present embodiment, multiple oxoacid anions are chemically bonded to the metal ion. Since multiple proton conductive paths are formed per the single structure, the proton conductive performance is improved. In addition, since the metal ion and the oxoacid anions are strongly bonded to each other by chemical bonds, outflow of the oxoacid anions can be restricted. In addition, since the cationic organic molecule and the anionic molecule are weakly bonded to each other with opposite charges, the structure can be a gelled substance. The gelled structure can increase a proton mobility, and can further increase the proton conductivity.

Hereinafter, a method for manufacturing the electrodes 120 and 130 will be described. First, the particulate catalyst 121a, 131a and the ionomer 121b, 131b (polymer and proton carrier) are mixed in a solvent such as ethanol to form an ink. The ink is coated on a carbon cloth for the diffusion layer 122, 132 and dried. In this way, the catalyst layers 121, 131 and the diffusion layers 122, 132 forming the electrodes 120, 130 are obtained.

Here, the proton conductor of this embodiment will be described with reference to a working example, a first comparative example, and a second comparative example. The proton conductor of the working example is the coordination polymer, the proton conductor of the first comparative example is phosphoric acid, and the proton conductor of the second comparative example is a protic ionic liquid.

In the proton conductor of the working example, ammonium cation was used as the cationic organic molecule. Specifically, diethylmethylammonium (dema) was used as the cationic organic molecule. In the proton conductor of the working example, trifluoromethanesulfonate (TfO) was used as the oxoacid anion of the anionic molecule, and aluminum ion was used as the metal ion of the anionic molecule. The coordination number of Al is 4 and 6.

The proton conductor of this working example was a coordination polymer in which trifluoromethanesulfonate-diethylmethylammonium ([dema][TfO]), which is a protonic ionic liquid, was coordinated to aluminum.

In the first comparative example, orthophosphoric acid was used as the proton conductor. As the phosphoric acid of the first comparative example, "orthoPhosphoric acid 99% cryst. for analysis Ensure (registered trademark)" manufactured by Merck Ltd. was used. In the second comparative example, protic ionic liquid [dema][TfO] was used as the proton conductor.

Here, a method for producing the protic ionic liquid [dema][TfO] will be described. The protic ionic liquid [dema][TfO] is a raw material for the proton conductor of the working example, and the proton conductor itself of the second comparative example.

First, 14.97 g (0.172 mol) of diethylmethylamine was added into an eggplant flask, and the eggplant flask was placed in an ice bath. While stirring with a stirrer, 25 g (0.167 mol) of trifluoromethanesulfonic acid (TfOH) was added dropwise into the eggplant flask. After all of the TfOH was added dropwise, the mixture was stirred at room temperature for one day. Then, the mixture was vacuumed at 100° C. for one day.

Through the above steps, the protic ionic liquid [dema][TfO] can be obtained. The protic ionic liquid [dema][TfO] has a chemical structure represented by the following chemical formula 1.

[Chemical Formula 1]

Next, a method for producing the proton conductor of the working example will be described. First, 90.5 mg (0.19 mol) of Al(TfO)$_3$ was dissolved in 1.5 ml of ethanol, and 1.5 g (6.32 mmol) of [dema][TfO] was added into the mixture of Al(TfO)$_3$ and ethanol to obtain a solution. Then, the obtained solution was heated at 160° C. for an hour.

Through the above steps, the proton conductor of the working example can be obtained. The proton conductor of the working example is a low-viscosity gelled substance. The proton conductor of the working example has a chemical structure represented by the following chemical formula 2.

[Chemical Formula 2]

As shown in the chemical formula 2, the proton conductor of the working example is a complex including a structural unit in which four TfOs are coordinated to Al whose coordination number is 4 and a structural unit in which four TfOs and two TfOHs are coordinated to Al whose coordination number is 6.

Next, the electrodes (i.e., the anode electrode and the cathode electrode) were produced using the proton conductors of the working example, the first comparative example, and the second comparative example.

After weighing 0.2 g of Pt/C powder carrying 40 wt % of Pt, 8.56 ml of ethanol, 0.96 ml of water, and 0.035 g of polytetrafluoroethylene (PTFE), these were mixed with an ultrasonic homogenizer to form an electrode ink. This electrode ink was spray-coated on a commercially available gas diffusion electrode for a fuel cell (SigracetRBC29) so that the carrying amount of Pt was 0.3 mg/cm$^2$ to obtain an electrode material. The electrode material had a size of 1 cm×1.4 cm.

In the working example, 15 µL of the coordination polymer having the chemical formula 2 was added dropwise to the electrode material to prepare an anode electrode and a cathode electrode. In the first comparative example, 15 µL of phosphoric acid was added dropwise to the electrode material to prepare an anode electrode and a cathode electrode. In the second comparative example, 15 µL of the protic ionic liquid [dema][TfO] having the chemical formula 1 was added dropwise to the electrode material to prepare an anode electrode and a cathode electrode. Then, the prepared anode electrode and cathode electrode in each of the working electrode, the first comparative example, and the second comparative example, are attached respectively to the both sides of the electric membrane that is made of phosphoric acid-doped polybenzimidazole thin film to from a membrane electrode assembly (MEA).

Next, adsorption energy on platinum of the proton conductor of the working example (i.e., coordination polymer), the proton conductor of the first comparative example (i.e., phosphoric acid), and the proton conductor of the second comparative example (i.e., protic ionic liquid) will be explained. Hereinafter, measurement results, in the working example, the first comparative example, and the second comparative example, of distance between O atom in the proton conductor and Pt atom in the catalyst, and measurement results of adsorption energy on platinum of the proton conductor will be described.

In the proton conductor of the working example, the distance between O atom and Pt atom and the adsorption energy on platinum were measured for each of the structural unit containing Al whose coordination number is 4 and the structural unit containing Al whose coordination number is 6. Specifically, in the structural unit containing Al whose coordination number is 4, the distance between O atom and Pt atom was 2.68 angstroms, and adsorption energy on platinum was −0.7 eV. In the structural unit containing Al whose coordination number of 6, the distance between O atom and Pt atom was 2.63 angstroms, and adsorption energy on platinum was −1.3 eV.

In the proton conductor of the first comparative example, the distance between O atom and Pt atom was 2.17 angstroms, and adsorption energy on platinum was −1.76 eV. In the proton conductor of the second comparative example, the distance between O atom and Pt atom was 2.60 angstrom, and adsorption energy on platinum was −0.4 eV.

The shorter the distance between O atom contained in the proton conductor and Pt atom contained in the catalyst is, the greater the absolute value of the adsorption energy on platinum of the proton conductor is. In the proton conductors of the working example and the second comparative example, the distance between O atom and Pt atom is longer than the distance between O atom and Pt atom of the proton conductor of the first comparative example (i.e., 2.17 angstrom). Further, the absolute value of the adsorption energy on platinum of the proton conductor of each of the working example and the second comparative example is smaller than the absolute value of the adsorption energy on platinum of the proton conductor of the first comparative (i.e., −1.76 eV). Thus, the proton conductors of the working example and the second comparative example can suppress poisoning of platinum more than the proton conductor of the first comparative example. Thus, in the working example and the second comparative example, the catalytic activity can be restricted from being lowered even after long-term use.

Figure 2:
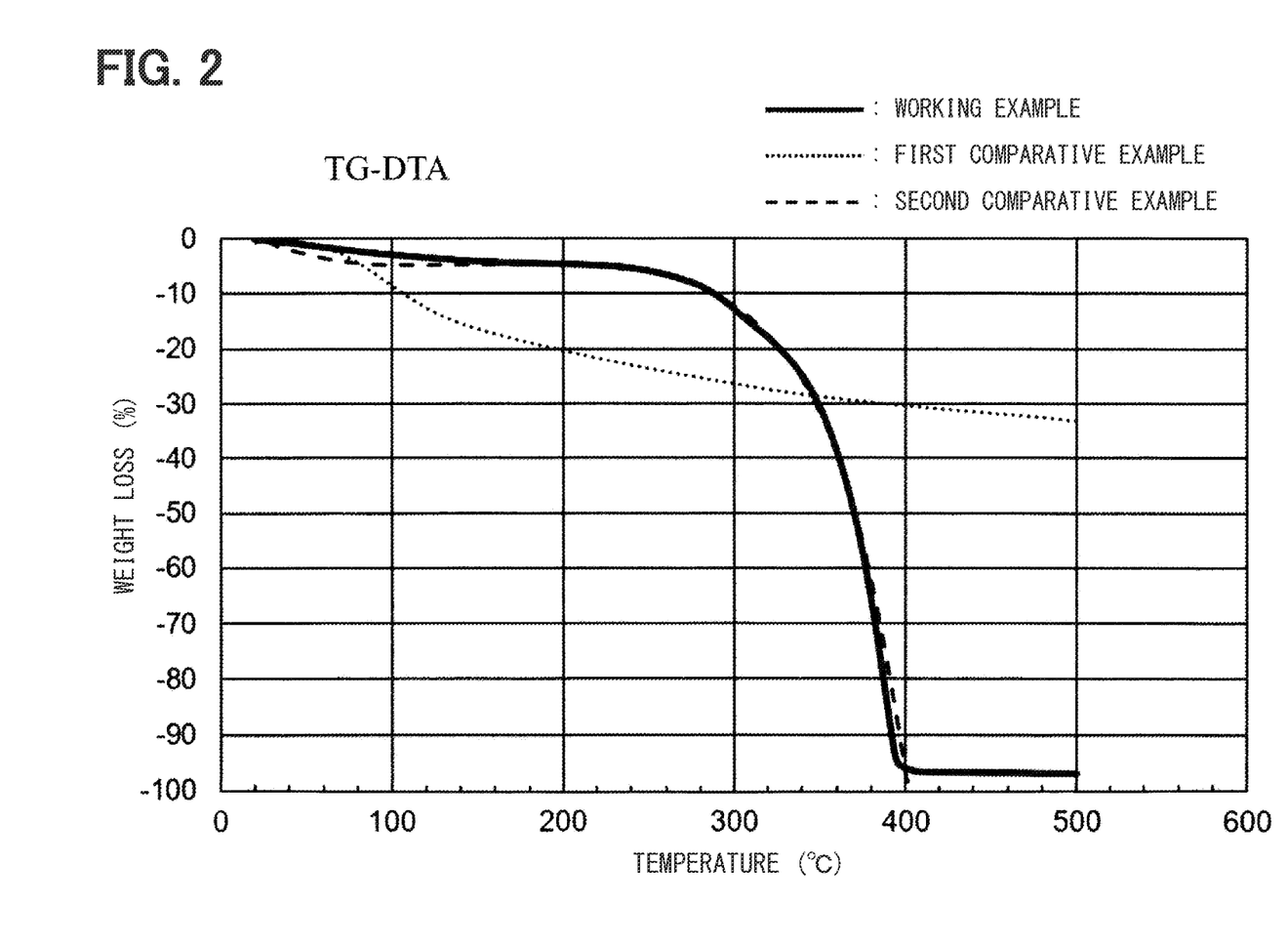
FIG. 2 is a diagram illustrating results of thermogravimetric differential thermal analysis of a working example, a first comparative example, and a second comparative example.

Next, with reference to FIG. 2, results of thermogravimetric-differential thermal analysis (TG-DTA) for the proton conductor of the working example (i.e., the coordination polymer), the proton conductor of the first comparative example (i.e., phosphoric acid), and the proton conductor of the second comparative example (i.e., the protic ionic liquid) will be described. FIG. 2 illustrates the results of thermogravimetric differential thermal analysis performed in the range from room temperature to 500° C. In FIG. 2, the horizontal axis indicates the temperature of the proton conductor, and the vertical axis indicates weight loss percentage of the proton conductor.

As shown in FIG. 2, the weight of the proton conductor of the first comparative example gradually decreases at 100° C. or higher due to volatilization. As a result, when the proton conductor of the first comparative example is used in a fuel cell operating at 100° C. or higher, the ionic conductivity and the catalytic activity are lowered, and the power generation performance is lowered.

In contrast, in the proton conductors of the working example and the second comparative example, no weight loss was observed up to around 250° C. Each of the proton conductors of the working example and the second comparative example has low vapor pressure and is less likely to volatilize even at 100° C. or higher. That is, the proton conductors of the working example and the second comparative example have high heat resistance. Thus, when the proton conductors of the working example and the second comparative example are used for a fuel cell operating at 100° C. or higher, a decrease in the ionic conductivity and the catalytic activity can be suppressed and a decrease in power generation performance can be suppressed.

Figure 3:
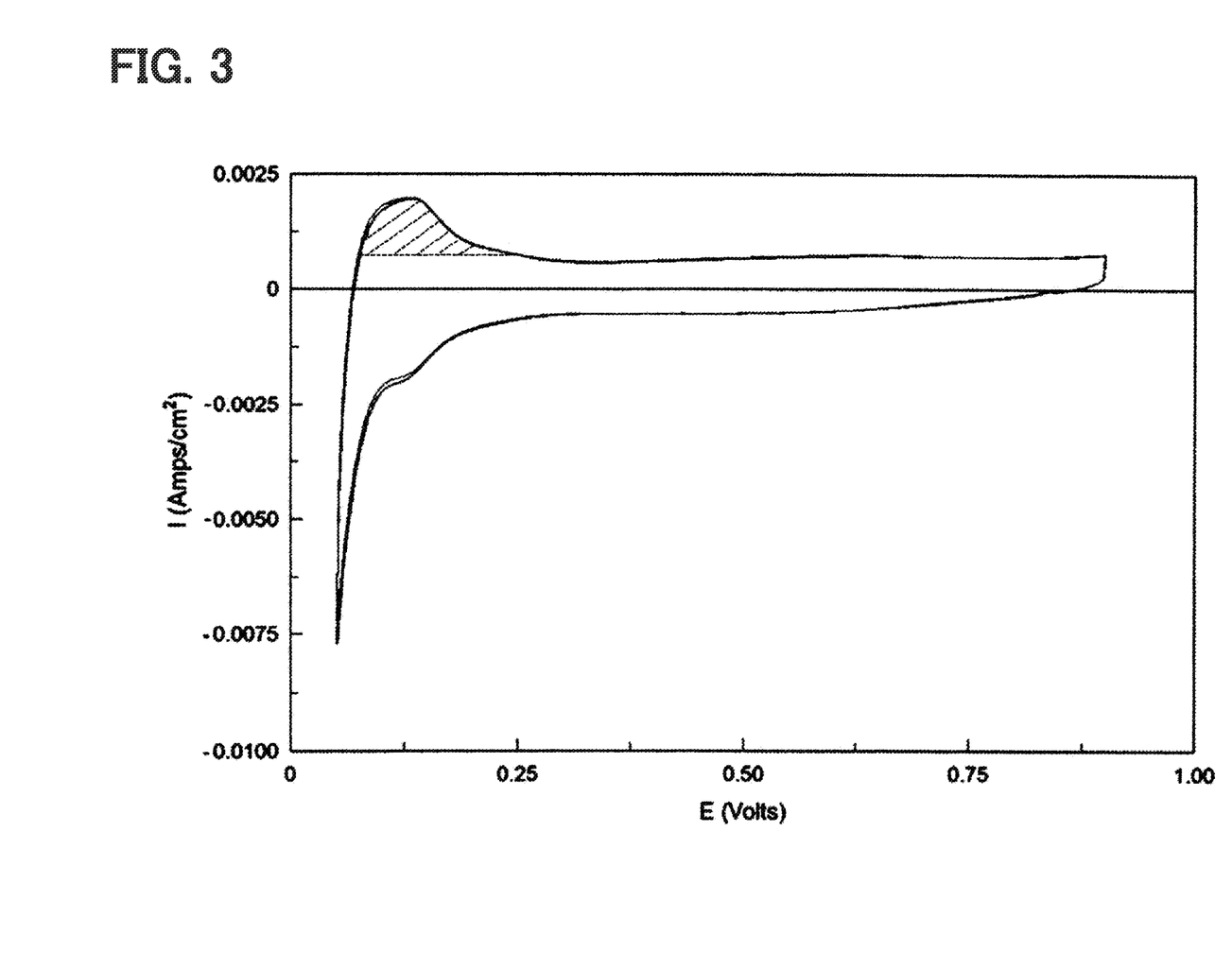
FIG. 3 is a diagram illustrating a cyclic voltammogram of the working example.
Figure 4:
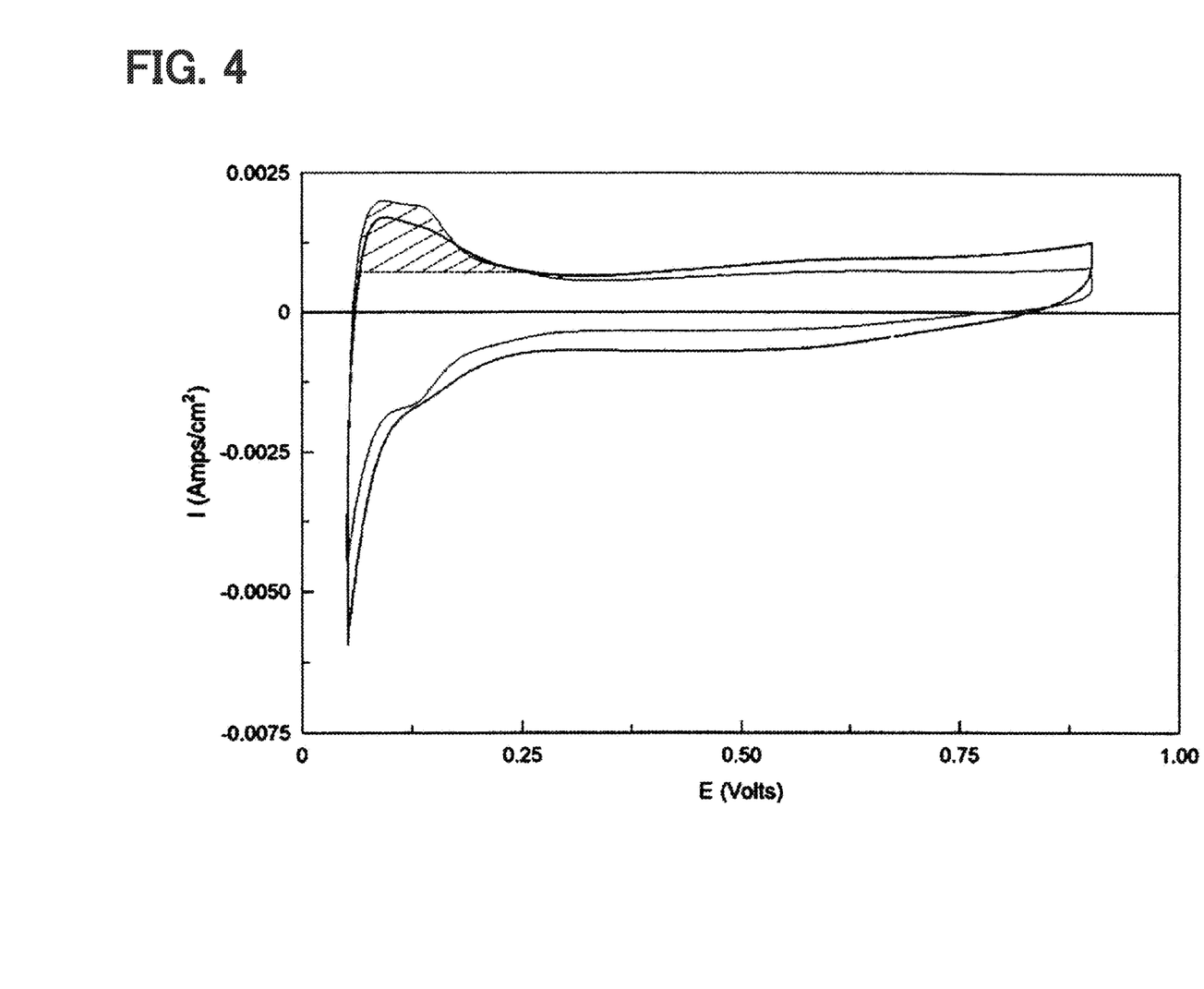
FIG. 4 is a diagram illustrating a cyclic voltammogram of the first comparative example.

Next, with reference to FIGS. 3 and 4, results of calculating electrochemical active surface area (ECSA) of each of the membrane electrode assembly including the proton conductor of the working example (i.e., the coordination polymer) and the membrane electrode assembly including the proton conductor of the second comparative example (i.e, the protic ionic liquid) will be described. FIG. 3 illustrates the cyclic voltammogram of the working example and FIG. 4 illustrates the cyclic voltammogram of the second comparative example. ECSA is an active area of platinum on which a cathodic reaction or an anodic reaction occurs.

In the cyclic voltammetry measurements, the membrane electrode assembly was heated at 150° C. while supplying 100% hydrogen to one electrode of the membrane electrode assembly and 100% oxygen to the other electrode. The flow rates of hydrogen and oxygen were 100 mL/min, respectively. Then, after the temperature of the membrane electrode assembly was stabilized, the potential was swept from the open circuit voltage to 0.1 V at a sweep rate of 0.2 mV/sec to measure cyclic voltammograms and calculate ECSA. Further, the temperature of the membrane electrode assembly was kept at 150 C for 10 hours and then cyclic voltammograms were measured again with the same method to calculate ECSA after 10 hours.

In the cyclic voltammograms of FIGS. 3 and 4, the area indicated by the diagonal lines indicates an amount of electricity related to hydrogen adsorption. ECSA can be obtained by dividing this value by representative value of surface charge per surface area of platinum and the loading amount of platinum.

In the working example shown in FIG. 3, the initial value of ECSA calculated from the cyclic voltammogram was 23.92 [$m^2$/g-Pt]. The ECSA calculated from the cyclic voltammogram after 10 hours was 23.96 [$m^2$/g-Pt].

In the first comparative example shown in FIG. 4, the initial value of ECSA calculated from the cyclic voltammogram was 21.31 [$m^2$/g-Pt]. The ECSA calculated from the cyclic voltammogram after 10 hours was 18.25 [$m^2$/g-Pt].

As described above, higher ECSA was obtained in the working example than in the first comparative example. That is, poisoning to platinum can be suppressed and high power generation performance can be obtained in the working example. Further, in the first comparative example, the ECSA decreased significantly after the lapse of 10 hours, whereas in the working example, the ECSA did not decrease even after the lapse of 10 hours. That is, the proton conductor of the working example has higher heat resistance.

Figure 5:
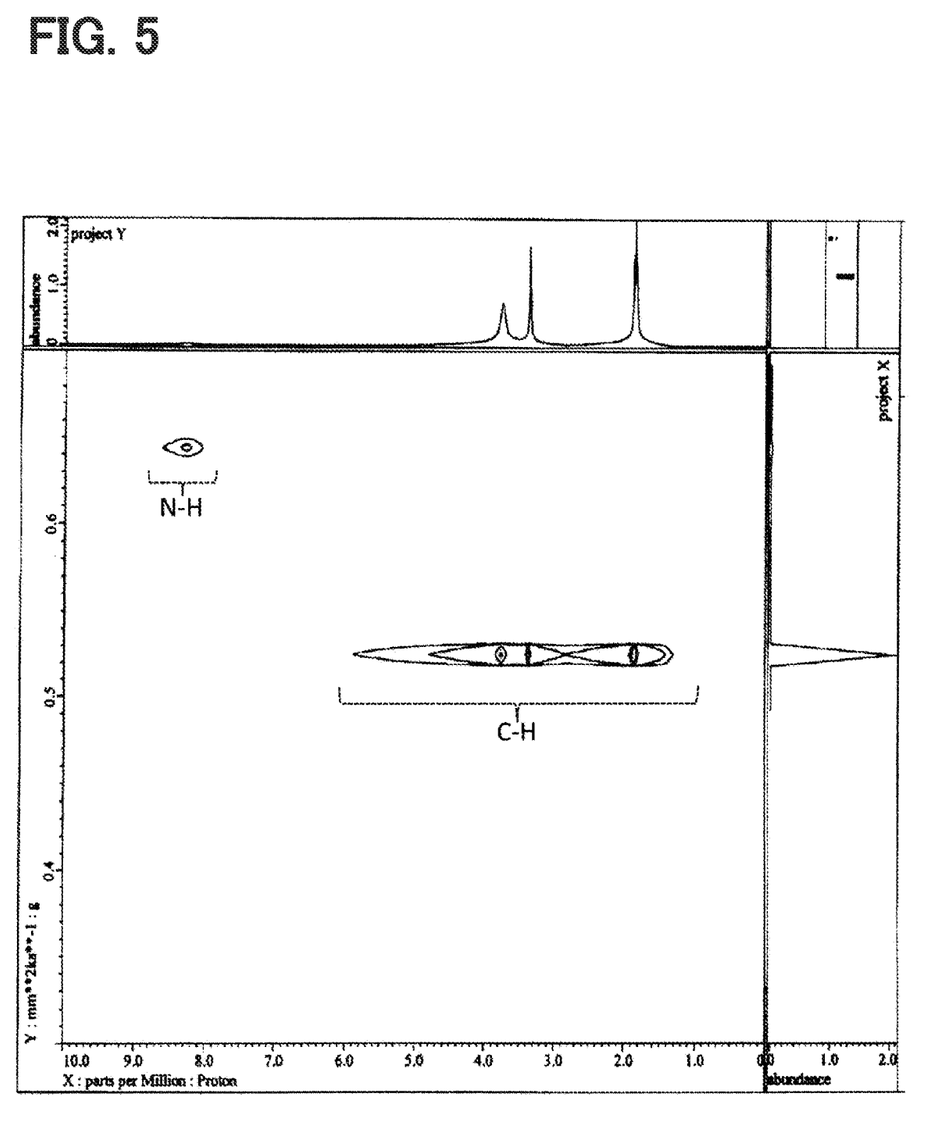
FIG. 5 is a diagram illustrating a $^1$H-DOSY spectrum of the working example.
Figure 6:
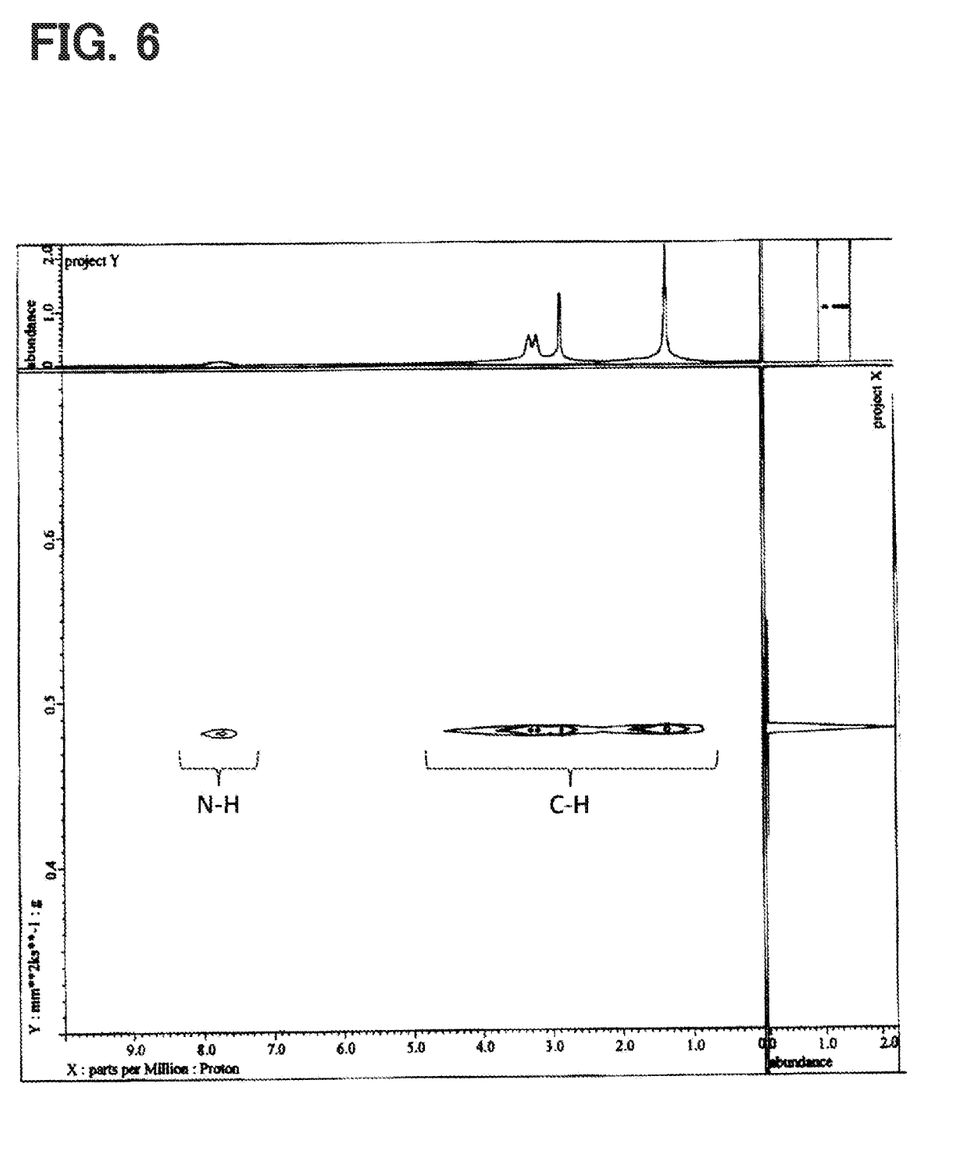
FIG. 6 is a diagram illustrating a $^1$H-DOSY spectrum of the second comparative example.

Next, with reference to FIGS. 5 to 8, the proton transport number of each of the proton conductor of the working example (i.e., the coordination polymer) and the proton conductor of the second comparative example (i.e., the protic ionic liquid) will be described. FIGS. 5 and 6 are $^1$H-DOSY spectra derived from $^1$H-PGSE-NMR (pulsed gradient spin-echo NMR). FIG. 5 is the spectrum of the working example and FIG. 6 is the spectrum of the second comparative example. In FIGS. 5 and 6, the vertical axis is the diffusion coefficient. The measurements in FIGS. 5 and 6 were performed at 150° C.

Three Dimensional-Diffusion-Ordered NMR Spectroscopy (DOSY) can separate spectra of protons according to differences in self-diffusion coefficients. Each of the proton conductors of the working example and the second comparative example contains C—H bonded protons and N—H bonded protons.

As shown in FIG. 5, in the proton conductor of the working example, the N—H bonded protons have a greater diffusion coefficient than the C—H bonded protons. This indicates that only the N—H bonded protons are moving at a high speed. That is, only the N—H bonded protons are selectively hopping in the proton conductor of the working example.

As shown in FIG. 6, in the proton conductor of the second comparative example, all of the protons have the same diffusion coefficient. These results indicate that, in the second comparative example, not only the protons are hopping and the entire molecule is moving.

Figure 7:
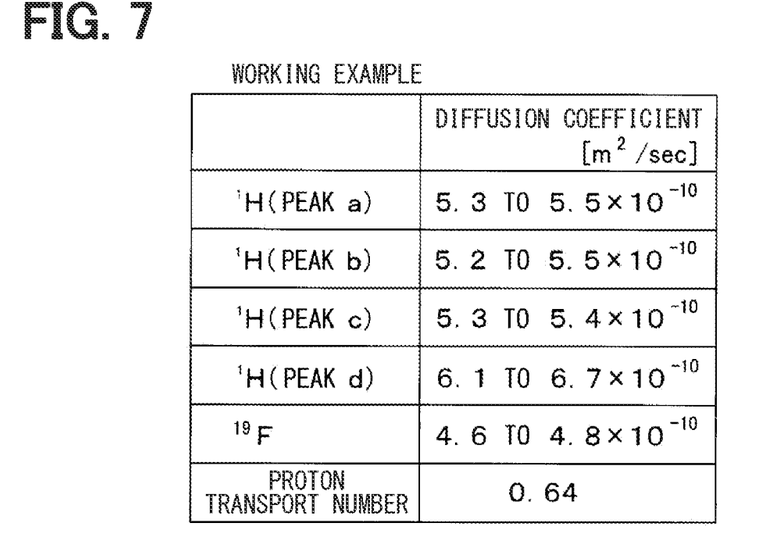
FIG. 7 is a table illustrating the proton transport number and diffusion coefficients of H and F of the working example.
Figure 8:
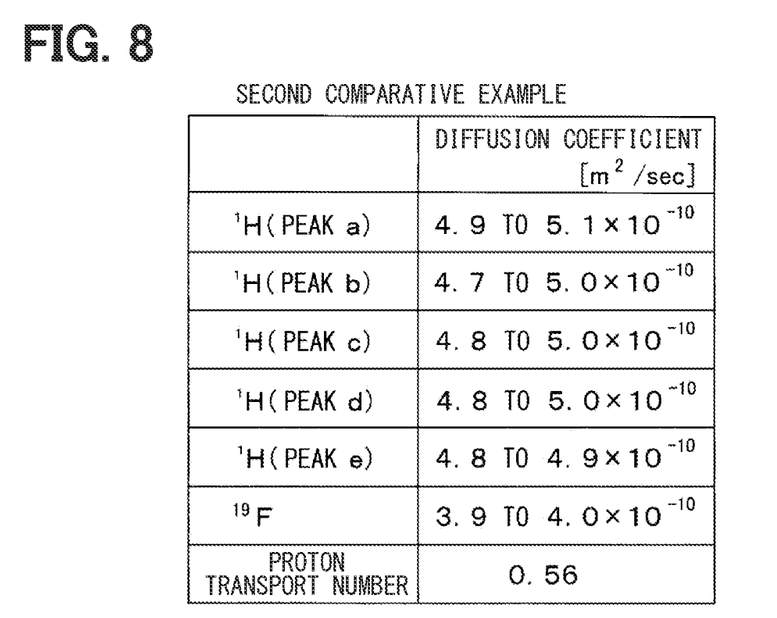
FIG. 8 is a table illustrating the proton transport number and diffusion coefficients of H and F of the second comparative example.

FIGS. 7 and 8 are tables indicating the diffusion coefficients of $^1$H obtained from $^1$H-PGSE-NMR, the diffusion coefficient of $^{19}$F obtained from $^{19}$F-PGSE-NMR, and the proton transport number calculated from these coefficients. FIG. 7 is the table of the working example and FIG. 8 is the table of the second comparative example.

In FIG. 7, the C—H bonded protons correspond to peaks a to c, and the N—H bonded protons correspond to peak d. In FIG. 8, the C—H bonded protons correspond to peaks a to c and e, and the N—H bonded protons correspond to peak d.

The proton transport number is obtained by dividing the diffusion coefficient of protons that can be hopping by the sum of the diffusion coefficient of cation and the diffusion coefficient of anion. The protons that can be hopping is the N—H bonded protons, the cation is the C—H bonded protons, and the anion is F ion. Thus, the proton transport number can be calculated by the following formula.

Proton transport number=(Diffusion coefficient of N—H bonded protons)/(Diffusion coefficient of C—H bonded protons (average value)+diffusion coefficient of $^{19}$F)

As shown in FIG. 7, the proton transport number of the working example was 0.64, and as shown in FIG. 8, the proton transport number of the second comparative example was 0.56. The proton transport number is improved in the working example compared to that in the second comparative example and loss is small. Thus, in the membrane electrode assembly including the proton conductor of the working example, the decrease in electromotive force can be suppressed and the decrease in power generation performance can be suppressed.

Figure 9:
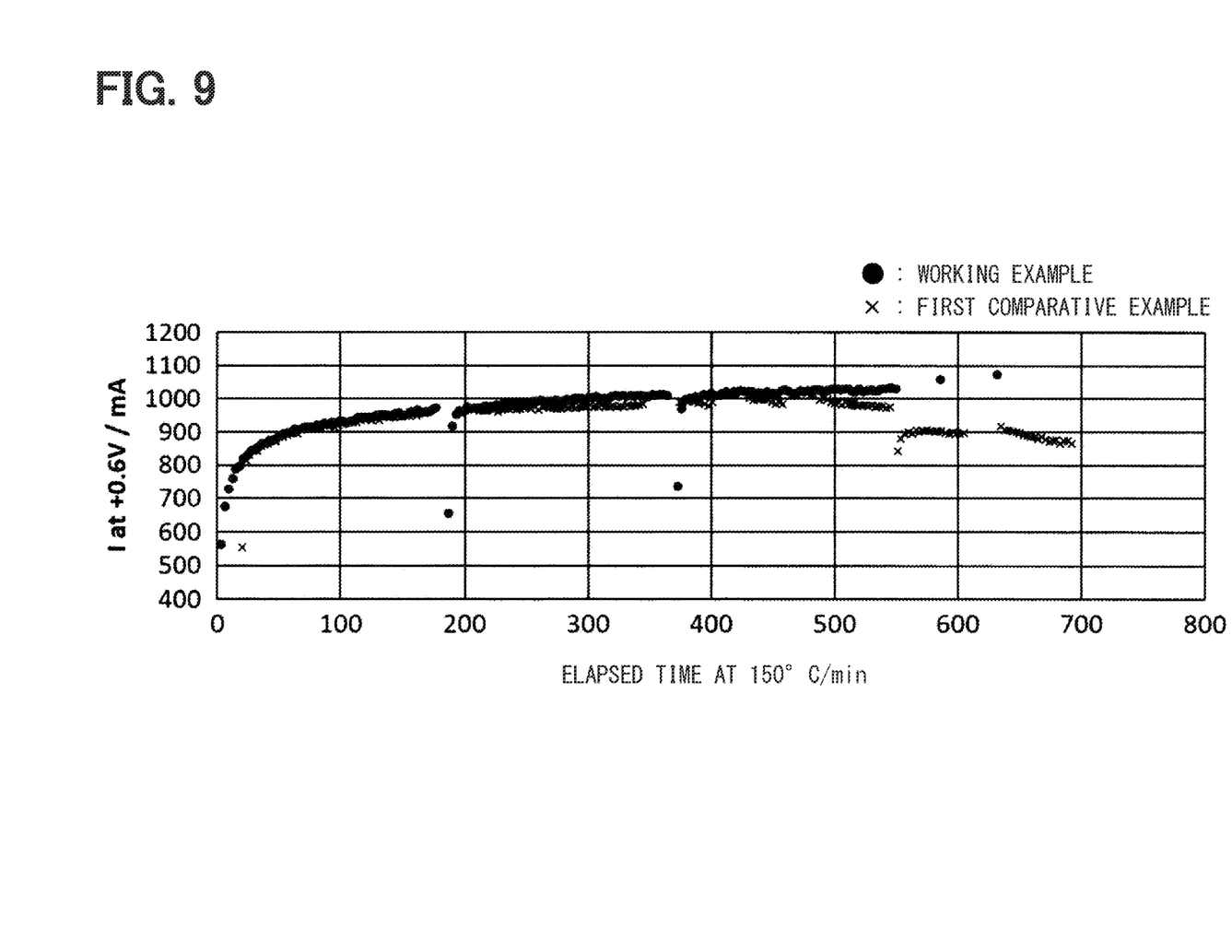
FIG. 9 is a diagram illustrating I-V characteristics of the working example and the first comparative example.

Next, with reference to FIG. 9, the power generation performances and durability of the membrane electrode assembly including the proton conductor of the working example (i.e, the coordination polymer) and the membrane electrode assembly including the proton conductor of the first comparative example (i.e., phosphoric acid) will be described. FIG. 9 illustrates the I-V characteristics of the membrane electrode assembly including the proton conductor of the working example and the membrane electrode assembly including the proton conductor of the first comparative example. In FIG. 9, the vertical axis indicates current (mA) when a load of 0.6 V is applied to the membrane electrode assembly, and the horizontal axis indicates elapsed time (min).

In the measurement of the I-V characteristic, the membrane electrode assembly was heated at 150° C. while 100% hydrogen was supplied to one electrode of the membrane electrode assembly at a flow rate of 100 mL/min and 100% oxygen was supplied to the other electrode at a flow rate of 100 mL/min. Then, after the temperature of the membrane electrode assembly was stabilized, the potential was continuously swept from the open circuit voltage to 0.2 V at a sweep rate of 5 mV/sec.

In FIG. 9, the current at 0.6 V versus time during potential sweep of the membrane electrode assembly of the working example and the membrane electrode assembly of the first comparative example are plotted. As shown in FIG. 9, higher current was obtained in the working example than in the first comparative example. That is, the membrane electrode assembly including the proton conductor of the working example has higher power generation performance than that of the first comparative example.

Further, in the first comparative example, the current decreases with the passage of time, whereas in the working example, the current does not decrease with the passage of time. That is, the membrane electrode assembly including the proton conductor of the working example is superior in durability to that of the first comparative example.

The proton conductor of the present embodiment described above is configured as a coordination polymer in which a protic ionic liquid is coordinated to a metal.

The proton conductor of the present embodiment has a higher proton transport number than the proton conductor composed of a protic ionic liquid. Thus, the fuel cell 100 using the proton conductors of the present embodiment as the ionomers 121*b* and 131*b* can suppress decrease in electromotive force and decrease in power generation performance. Further, in the electrodes 120 and 130 using the proton conductor of the present embodiment as the ionomers 121*b* and 131*b*, a using amount of the platinum catalysts can be reduced.

In addition, the proton conductor of the present embodiment can suppress poisoning of platinum as compared with the proton conductor composed of phosphoric acid, and can suppress deterioration of power generation performance. Further, the proton conductor of the present embodiment has higher heat resistance and higher durability than the proton conductor composed of phosphoric acid.

OTHER EMBODIMENTS

The present disclosure is not limited to the embodiment described hereinabove, but may be modified in various ways as hereinbelow without departing from the gist of the present disclosure. Further, means disclosed in the above embodiments may be appropriately combined with each other within a range that can be implemented.

For example, in the above embodiments, an example in which the proton conductor of the present disclosure is applied as the electrodes 120, 130 of the fuel cell 100 is described, but the present disclosure is not limited to this. The proton conductor of the present disclosure may be used for applications other than fuel cells such as steam electrolysis and hydrogen separation membranes.

Further, in the above embodiment, an example in which the proton conductor of the present disclosure is applied as the electrodes 120 and 130 of the fuel cell 100 is described, but the proton conductor of the present disclosure may be applied as the electrolyte membrane 110 of the fuel cell 100.

What is claimed is:

1. A proton conductor in contact with a catalyst containing platinum, the proton conductor comprising:
    a cationic organic molecule containing diethylmethylammonium;
    a metal ion; and
    an oxoacid anion, wherein
    a protic ionic liquid containing the cationic organic molecule and the oxoacid anion is coordinated to the metal ion to form a coordination polymer.

2. The proton conductor according to claim 1, wherein the oxoacid anion is trifluoromethanesulfonate.

3. The proton conductor according to claim 1, wherein the protic ionic liquid is diethymethylammonium-trifluoromethanesulfonate.

4. The proton conductor according to claim 1, wherein the metal ion is an aluminum ion.

5. The proton conductor according to claim 1, wherein the coordination polymer has an absorption energy on platinum that has an absolute value less than an absolute value of −1.76 eV.

6. A fuel cell comprising:
    a pair of electrodes; and
    an electrolyte membrane interposed between the pair of electrodes,
    wherein the pair of electrodes include:
        a catalyst containing platinum; and
        an ionomer including the proton conductor according to claim 1.

7. A proton conductor in contact with a catalyst containing platinum, the proton conductor comprising:
    a cationic organic molecule;
    a metal ion; and
    an oxoacid anion containing trifluoromethanesulfonate, wherein a protic ionic liquid containing the cationic organic molecule and the oxoacid anion is coordinated to the metal ion to form a coordination polymer.

8. The proton conductor according to claim 7, wherein the cationic organic molecule is diethylmethylammonium.

9. The proton conductor according to claim 7, wherein the protic ionic liquid is diethymethylammonium-trifluoromethanesulfonate.

10. The proton conductor according to claim 7, wherein the metal ion is an aluminum ion.

11. The proton conductor according to claim 7, wherein the coordination polymer has an absorption energy on platinum that has an absolute value less than an absolute value of −1.76 eV.

12. A fuel cell comprising:
a pair of electrodes; and
an electrolyte membrane interposed between the pair of electrodes,
wherein the pair of electrodes include:
a catalyst containing platinum; and
an ionomer including the proton conductor according to claim 7.

13. A proton conductor in contact with a catalyst containing platinum, the proton conductor comprising:
a cationic organic molecule;
a metal ion; and
an oxoacid anion, wherein
a protic ionic liquid containing the cationic organic molecule and the oxoacid anion is coordinated to the metal ion to form a coordination polymer, and
the protic ionic liquid is diethymethylammonium-trifluoromethanesulfonate.

14. The proton conductor according to claim 13, wherein the cationic organic molecule is diethylmethylammonium.

15. The proton conductor according to claim 13, wherein the oxoacid anion is trifluoromethanesulfonate.

16. The proton conductor according to claim 13, wherein the metal ion is an aluminum ion.

17. The proton conductor according to claim 13, wherein the coordination polymer has an absorption energy on platinum that has an absolute value less than an absolute value of −1.76 eV.

18. A fuel cell comprising:
a pair of electrodes; and
an electrolyte membrane interposed between the pair of electrodes,
wherein the pair of electrodes include:
a catalyst containing platinum; and
an ionomer including the proton conductor according to claim 13.

* * * * *